(12) United States Patent
Kennedy

(10) Patent No.: US 12,102,934 B1
(45) Date of Patent: Oct. 1, 2024

(54) RELIGIOUS SPEAKING TEDDY BEAR

(71) Applicant: Warren Kennedy, Pensacola, FL (US)

(72) Inventor: Warren Kennedy, Pensacola, FL (US)

( * ) Notice: Subject to any disclaimer, the term of this patent is extended or adjusted under 35 U.S.C. 154(b) by 205 days.

(21) Appl. No.: 17/942,750

(22) Filed: Sep. 12, 2022

(51) Int. Cl.
| A63H 3/28 | (2006.01) |
| A63H 3/02 | (2006.01) |
| A63H 13/00 | (2006.01) |
| A63H 29/22 | (2006.01) |
| G09B 5/06 | (2006.01) |

(52) U.S. Cl.
CPC .............. *A63H 3/28* (2013.01); *A63H 3/02* (2013.01); *A63H 13/005* (2013.01); *A63H 29/22* (2013.01); *G09B 5/062* (2013.01)

(58) Field of Classification Search
CPC .......... A63H 3/28; A63H 3/02; A63H 13/005; A63H 29/22; G09B 5/062
USPC .......................................... 446/369, 298, 299
See application file for complete search history.

(56) References Cited

U.S. PATENT DOCUMENTS

| | | | | |
|---|---|---|---|---|
| 4,795,397 A * | 1/1989 | Stevens | ............. | A63H 3/36 446/369 |
| 4,850,930 A * | 7/1989 | Sato | ............. | A63H 3/28 446/175 |
| 5,059,149 A | 10/1991 | Stone | | |
| 5,096,424 A * | 3/1992 | Carlberg | ............. | G09B 19/00 446/302 |
| 5,279,514 A * | 1/1994 | Lacombe | ............. | A63H 3/28 446/175 |
| 5,376,038 A * | 12/1994 | Arad | ............. | A63H 3/28 446/302 |
| 5,807,155 A * | 9/1998 | Divvleeon | ............. | A63H 3/003 446/73 |
| 6,007,404 A * | 12/1999 | Trevino | ............. | G09B 19/00 428/3 |
| 6,089,943 A | 7/2000 | Lo | | |
| 6,106,358 A * | 8/2000 | McKenzie | ............. | A47G 33/00 446/302 |
| 6,146,722 A * | 11/2000 | Slawin | ............. | A47G 1/0616 446/337 |
| 6,322,369 B1 * | 11/2001 | Patterson | ............. | G09B 19/00 434/245 |
| 6,447,363 B1 * | 9/2002 | Carraway | ............. | A47G 33/00 446/72 |
| 6,565,407 B1 * | 5/2003 | Woolington | ............. | A63H 13/005 446/175 |
| 2005/0079791 A1 * | 4/2005 | Treibitz | ............. | A63H 3/02 446/268 |
| 2006/0258256 A1 * | 11/2006 | Isenberg | ............. | A63J 19/00 446/98 |
| 2011/0097967 A1 * | 4/2011 | Berrymon | ............. | A63H 13/02 446/321 |

* cited by examiner

*Primary Examiner* — Nini F Legesse
(74) *Attorney, Agent, or Firm* — Sanchelima & Associates, P.A.; Christian Sanchelima; Jesus Sanchelima

(57) ABSTRACT

A religious speaking teddy bear including a stuffed animal assembly, an attachment assembly and an electronic assembly. The stuffed animal assembly includes a movable mouth. The movable mouth moves to emulate speaking. The attachment assembly includes attachments to illustrate the ten commandments. The attachments can be attached to the stuffed animal assembly. The electronic assembly includes buttons and a speaker. The buttons can be depressed to actuate the speaker to recite the ten commandments and the movable mouth to emulate speaking. The electronic assembly is inside the stuffed animal assembly.

1 Claim, 5 Drawing Sheets

RELIGIOUS SPEAKING TEDDY BEAR

II. BACKGROUND OF THE INVENTION

1. Field of the Invention

The present invention relates to a religious speaking teddy bear and, more particularly, to a religious speaking teddy bear that recites the ten commandments for teaching them to a kid.

2. Description of the Related Art

Several designs for teddy bears have been designed in the past. None of them, however, include a movable mouth which emulates the speaking of the teddy bear while reciting predetermined sounds and phrases.

Applicant believes that a related reference corresponds to U.S. Pat. No. 6,089,943 issued for a stuffed toy having a barcode scanner for scanning a number of barcodes each individually associated with a visual message in a book that the toy audibly reads through a speaker. Applicant believes that another related reference corresponds to U.S. Pat. No. 5,059,149 issued for a stuffed animal with an integral book. None of these references, however, teach of a talking stuffed toy animal comprising a stuffed teddy bear having an animatronic moving mouth and an audio speaker, wherein a card with the ten commandments is affixed to the bear and the speaker receives audio playback signals to form an integral data storage device.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide a religious speaking teddy bear that includes push buttons to actuate a speaker to recite the ten commandments.

It is another object of this invention to provide a religious speaking teddy bear that includes indicia to illustrate the ten commandments helping on teaching reading to a kid.

It is still another object of the present invention to provide a religious speaking teddy bear that includes a soft body to be easily used and manipulated by a kid.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which.

Figure 1:
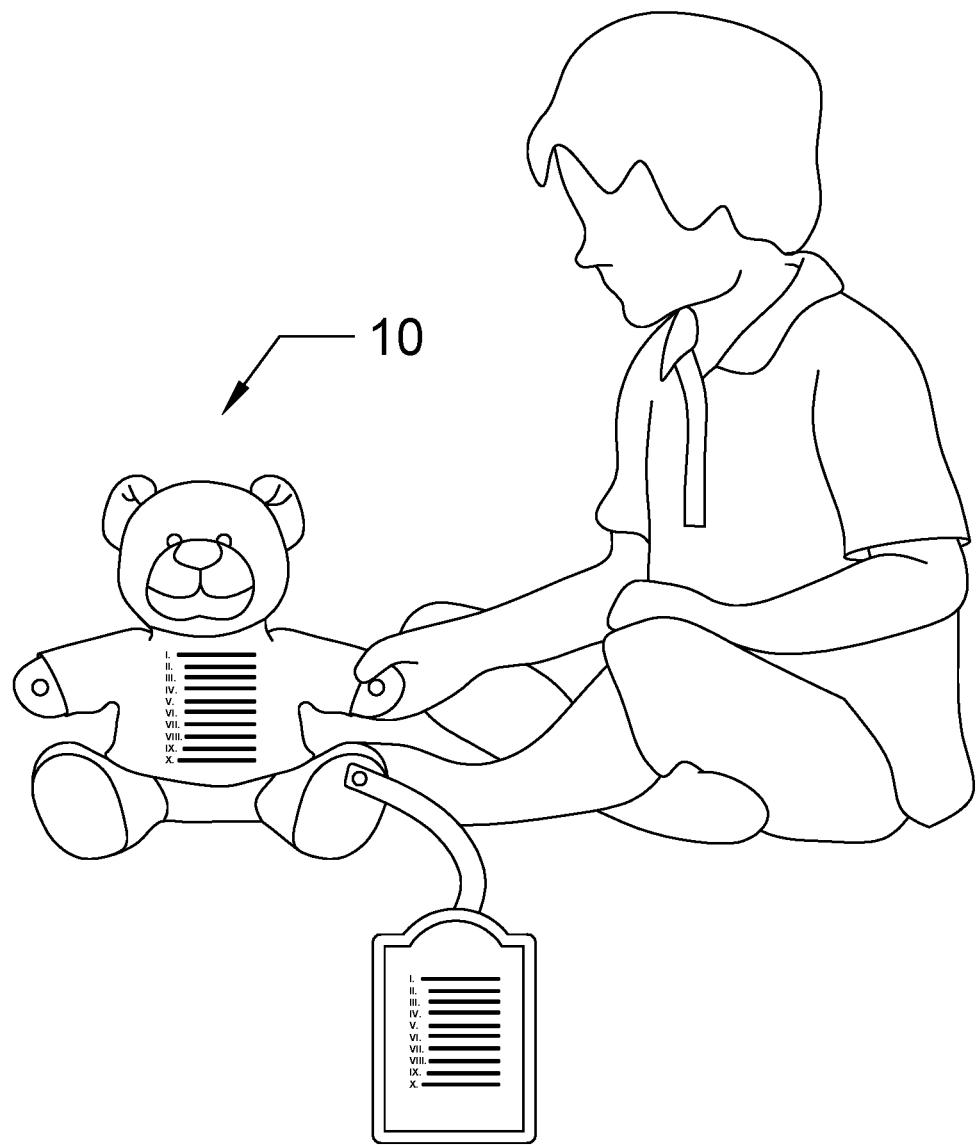
FIG. 1 represents an isometric operational view of the present invention 10 wherein a user is depressing a push button 62 to recite the ten commandments.
Figure 2:
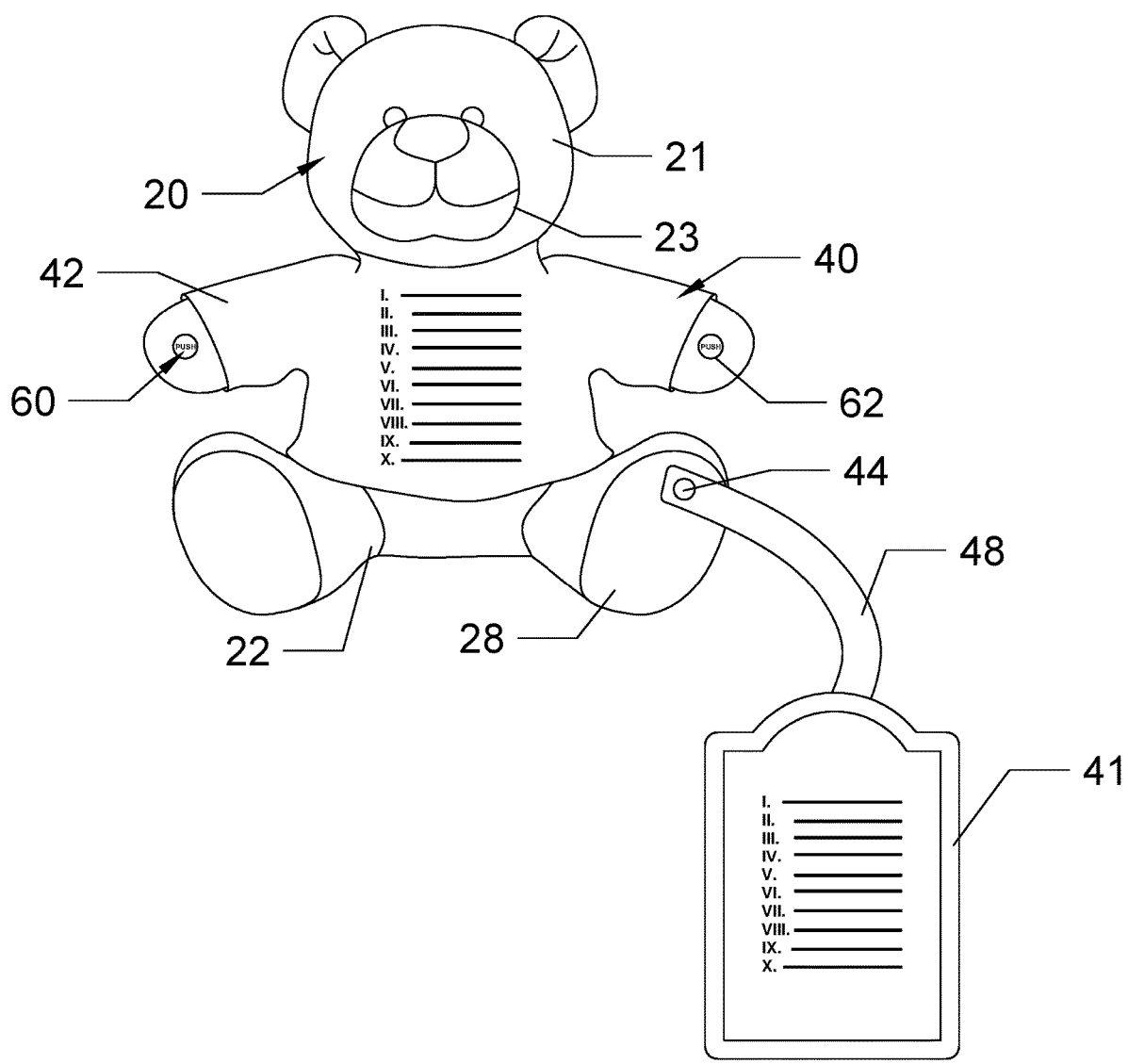
FIG. 2 shows an isometric view of the present invention 10.
Figure 3:
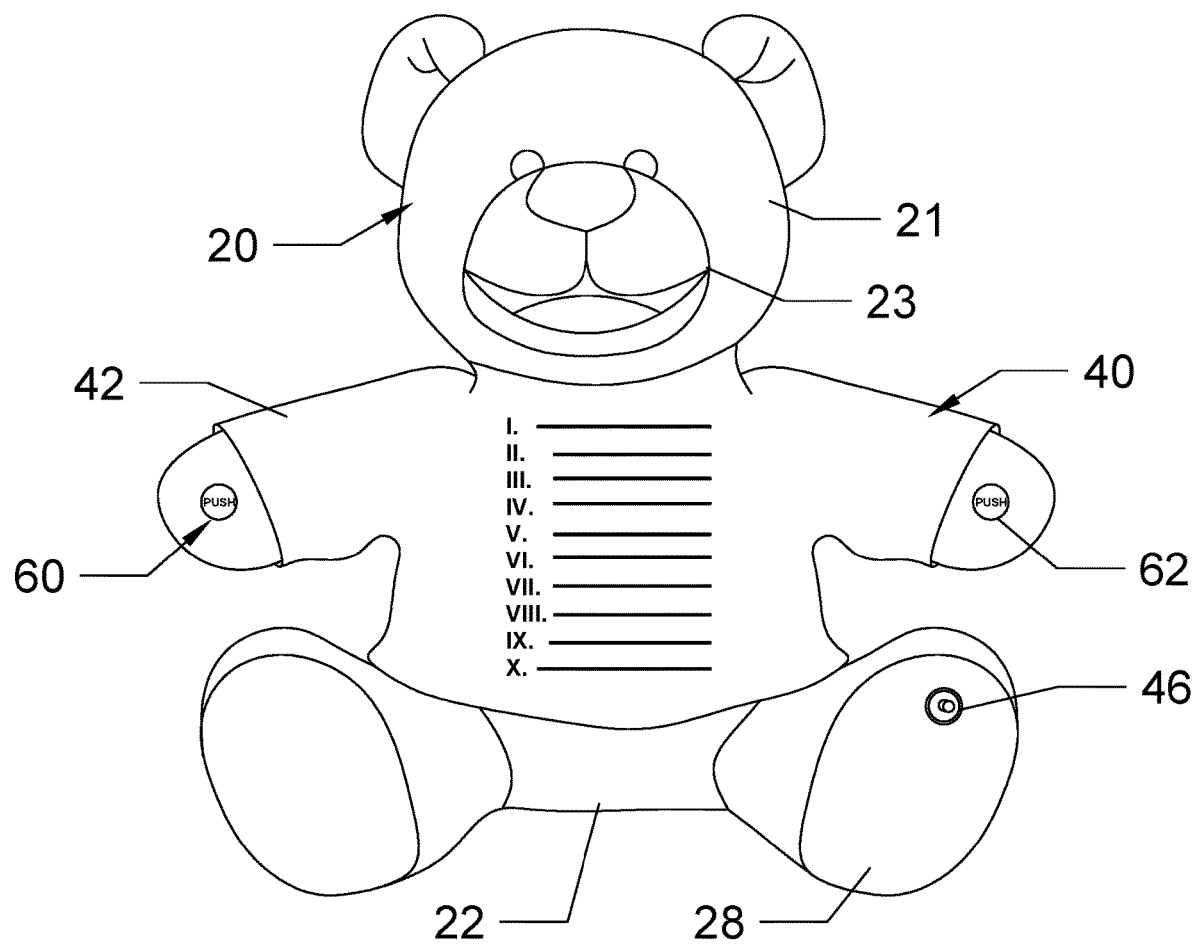

FIG. 3 shows and isometric view of the present invention 10 having the mouth 64 open and the card 41 detached from the attaching element 44.

Figure 4:
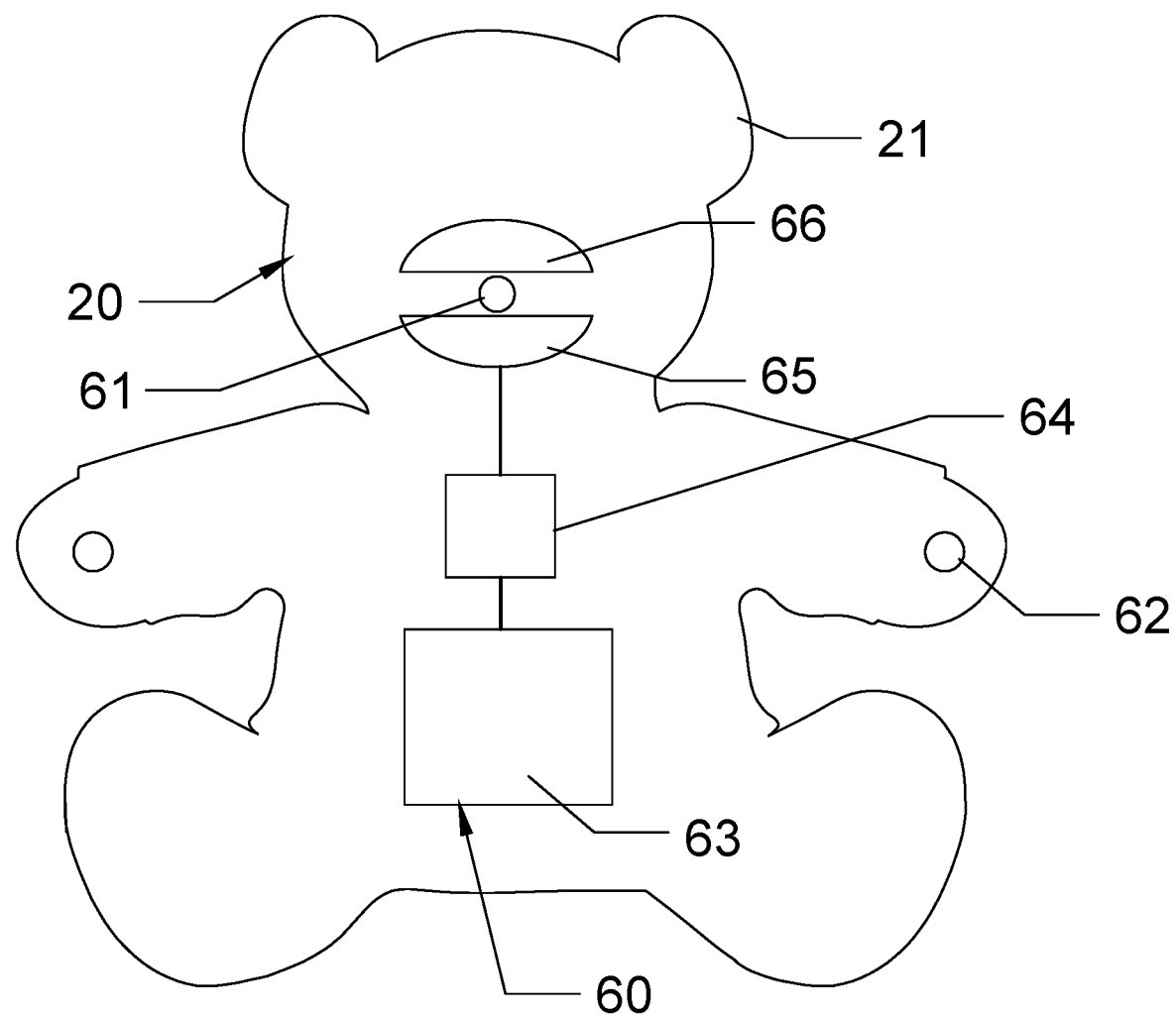

FIG. 4 illustrates a schematic view of the electronic assembly 60.

Figure 5:
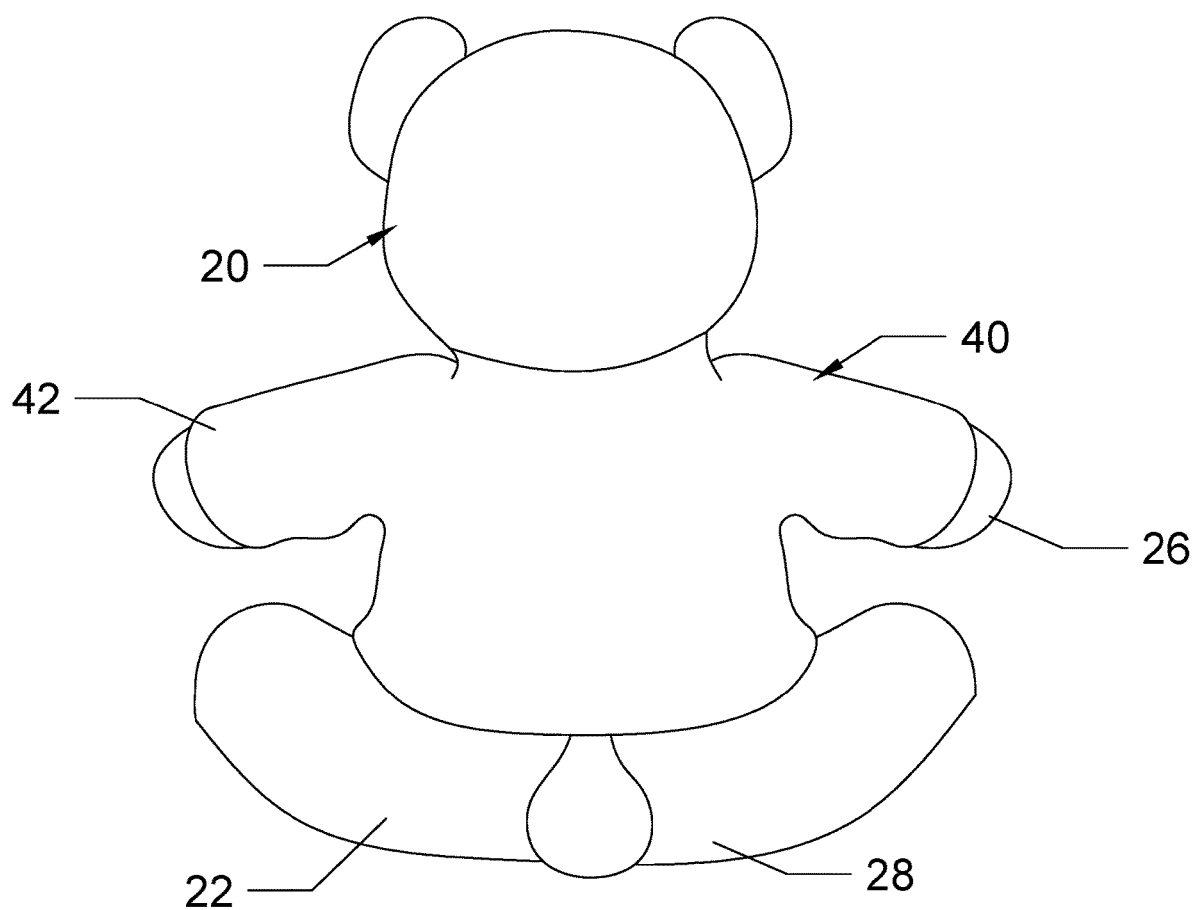

FIG. 5 is a representation of a rear view of the present invention 10.

V. DETAILED DESCRIPTION OF THE EMBODIMENTS OF THE INVENTION

Referring now to the drawings, where the present invention is generally referred to with numeral 10, it can be observed that it basically includes a stuffed animal assembly 20, an attachment assembly 40 and an electronic assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The stuffed animal assembly 20 may include a stuffed animal 22. The stuffed animal 22 may be a teddy bear. The stuffed animal 22 may have a predetermined shape and dimensions. Preferably, stuffed animal 22 may be made of cotton, wool, polyester, synthetic fiber or other similar material as known in the art of stuffed toy making, stuffed animal 22 may preferably be soft to the touch and cushioned. In one embodiment, it may be suitable for stuffed animal 22 to be scented. Stuffed animal 22 may include legs 28, arms 26 and a head 21. The arms 26 and the legs 28 may protrude outwardly from the stuffed animal 22. The arms 26 and the legs 28 may be made of cotton, wool, polyester, synthetic fiber or other similar material as known in the art of stuffed toy making.

The head 21 may substantially have a circular shape. The head 21 may have a movable mouth 23. The movable mouth 23 may move to emulate articulation of words. The movable mouth 23 may use animatronics technologies. It also may be suitable for the legs 28 and the arms 26 to use animatronics technologies to emulate movement. Animatronics technology is widely known in the prior art as a technique of animating three-dimensional characters by means of electromechanical devices. The movable mouth 23, the legs 28 and the arms 26 may move simulating realistic anatomical movements. It should be understood that the stuffed animal 22 may include therein a plurality of elements such as motor, shafts, actuators and so on to allow electromechanical movement of the movable mouth 23, legs 28 and arms 26. It also should be understood that the stuffed animal 22 may conform with the shape or any teddy bear as known in the prior art.

The attachment assembly 40 may include a shirt 42 and a card 41. The shirt 41 may be made of cotton, wool, silk, leather, or any other suitable material. The shirt 41 may conform with the shape of the stuffed animal 22. In a preferred embodiment the shirt 42 may be made of a waterproof material. It also may be suitable for the shirt 42 to include a waterproof layer. The shirt 42 may be removably attached on the stuffed animal 22. The shirt 42 may vary in color and dimensions. In a preferred embodiment the shirt 42 may include an illustration of the ten commandments. The ten commandments are known in the prior art as biblical principles in Judaism and Christianity.

The card 41 may be removable attached to the stuffed animal 22. The card 21 may include a rope 48. The card 21 may have a rectangular shape, a triangular shape, a circular shape, or any other suitable shape. The card 21 may be made of plastic, metal, or any other suitable material. The card 21 may have the ten commandments written therein. The rope 48 may have a distal end and a proximal end. The distal end of the rope 48 may be attached to a top portion of the card 41. The proximal end of the rope 48 may include a male fastener 44. The male fastener 44 may be coupled to a female fastener 46 to attach the rope 48 to the stuffed animal 22. The female fastener 46 may be located on an outer portion of the stuffed animal 22. In a preferred embodiment the female fastener 46 may be located on one of the legs 28 of the stuffed animal 22. It should be understood that the stuffed animal 22 may include additional female fasteners 46 and male fasteners 44 to removably attach a plurality of elements to the stuffed animal 22. Preferably, the female fastener 46 and the male fastener 44 may be coupled together defining a snap button. It also may be suitable for the female fastener 46 and the male fastener 44 to be coupled defining hook and loop fasteners or any other fastener means known in the prior art.

As best illustrated in FIG. 4, the electronic assembly 60 may include a battery 63, buttons 62, a microcontroller 64, a speaker 61, a top movable element 66 and a bottom movable element 65. The battery 63 may include lithium batteries, alkaline batteries, Carbon-Zinc batteries, or any other batteries known in the prior art. In a preferred embodiment the battery 63 may be a set of rechargeable batteries. The battery 63 may provide power to the electronic assembly 60. The battery 63, the microcontroller 64, the top movable element 66 and the bottom movable element 65 may be located inside the stuffed animal 22.

The buttons 62 may be located on an outer portion of the stuffed animal. In a preferred embodiment the buttons 62 may be two buttons located on each of the arms 26 of the stuffed animal 22. It also may be suitable for the buttons 62 to have any other configuration in the stuffed animal 22. The buttons 62 may have indicia to be identified as push buttons. When pressed, a signal may be sent to the microcontroller 64 to actuate the speaker 61, the top movable element 66 and the bottom movable element 61. In a preferred embodiment one of the buttons 62 may be pressed to actuate the speaker 61 to recite the first five commandments of the ten commandments. Another of the buttons 62 may be pressed to actuate the speaker 61 to recite the last five commandments of the ten commandments. It should be understood that the electronic assembly 60 may further include a memory to store a plurality of recording that may be played by the speaker 61. It also may be suitable for the buttons 62 to be used to actuate the speaker 61 to recite biblical verses, prayers, or any other suitable sound. The speaker 61 may be located on the movable mouth 23. The speaker 61 may be preferably located between the top movable element 66 and the bottom movable element 65.

The top movable element 66 and the bottom movable element 65 may move up and down to emulate mouth's movement. The top movable element 66 and the bottom movable element 65 may emulate the upper dental arch and the lower dental arch. The top movable element 66 and the bottom movable element 65 may move when one of the buttons 62 is pressed. The top movable element 66 and the bottom movable element 65 may be on the movable mouth 23. The top movable element 66 and the bottom movable element 65 may use animatronic technology.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A religious speaking teddy bear, consisting of:
   a stuffed animal assembly, wherein said stuffed animal assembly includes a movable mouth, legs and arms, said movable mouth moves to emulate speaking;
   an attachment assembly, wherein said attachment assembly includes a shirt and card, said shirt and said card include illustrations of the ten commandments, said shirt and said card are removably attached to said stuffed animal assembly, said card is removably attached to said stuffed animal assembly by means of a snap button, said shirt is made of a water-resistant material; and
   an electronic assembly, wherein said electronic assembly includes a first button, a second button, a battery, a microcontroller and a speaker, said first button and said second button are in communication with said microcontroller, said microcontroller is capable of actuate said speaker to recite the ten commandments, said microcontroller is capable of actuate said movable mouth to emulate speaking movement, said first button is pressed to actuate said speaker to recite the first five commandments of said ten commandments, said second button is pressed to actuate said speaker to recite the last five commandments of said ten commandments, said battery provides power to said electronic assembly, said electronic assembly is inside said stuffed animal.

* * * * *